(12) United States Patent
Raja et al.

(10) Patent No.: US 11,534,350 B2
(45) Date of Patent: Dec. 27, 2022

(54) ELECTRIC VEHICLE

(71) Applicant: Suzuki Motor Corporation, Hamamatsu (JP)

(72) Inventors: Gopinath Raja, Hamamatsu (JP); Masayoshi Wada, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 318 days.

(21) Appl. No.: 16/985,441

(22) Filed: Aug. 5, 2020

(65) Prior Publication Data

US 2021/0059880 A1    Mar. 4, 2021

(30) Foreign Application Priority Data

Aug. 27, 2019 (JP) .............................. JP2019-154841

(51) Int. Cl.
  *A61G 5/04* (2013.01)
  *A61G 5/10* (2006.01)
  *A61G 5/12* (2006.01)

(52) U.S. Cl.
  CPC ........... *A61G 5/041* (2013.01); *A61G 5/1056* (2013.01); *A61G 5/122* (2016.11)

(58) Field of Classification Search
  CPC ...... A61G 5/1056; A61G 5/041; A61G 5/122; A61G 5/08; A61G 5/0833; A61G 5/085; A61G 5/0866
  See application file for complete search history.

(56) References Cited

U.S. PATENT DOCUMENTS

| 10,562,583 | B1 * | 2/2020 | Chan | B62K 5/06 |
| 10,730,579 | B2 * | 8/2020 | Chang | B62K 5/01 |
| 10,987,261 | B2 * | 4/2021 | Raja | B62D 21/14 |
| 11,123,243 | B2 * | 9/2021 | Wada | A61G 5/1089 |
| 11,173,080 | B2 * | 11/2021 | Raja | B60B 19/003 |

(Continued)

FOREIGN PATENT DOCUMENTS

| CN | 102579208 A | 7/2012 |
| EP | 2945840 A1 | 11/2015 |

(Continued)

OTHER PUBLICATIONS

French Preliminary Search Report including Written Opinion for Application No. 2008273 dated Feb. 21, 2022, pp. 1-8.

*Primary Examiner* — Jacob D Knutson
*Assistant Examiner* — Harold Eric Pahlck, III
(74) *Attorney, Agent, or Firm* — Lerner, David, Littenberg, Krumholz & Mentlik, LLP (57) ABSTRACT

In an electric vehicle, a seat on a mobile base can move between a sitting position in which a sitting surface faces the vehicle upper side, and a retracted position in which a seating portion having the sitting surface is retracted from the sitting position to the vehicle front side, a back plate on the mobile base can move between a raised position on the vehicle rear side and the vehicle upper side with respect to the seating portion in the sitting position, and a laid down position on the vehicle front side with respect to the raised position, a cargo bed portion on the mobile base is positioned on the vehicle lower side with respect to the seating portion of the seat in the sitting position and is positioned on the vehicle rear side with respect to the seating portion of the seat in the retracted position.

4 Claims, 6 Drawing Sheets

(56) References Cited

U.S. PATENT DOCUMENTS

| | | | | |
|---|---|---|---|---|
| 11,191,683 | B2* | 12/2021 | Raja | A61G 3/005 |
| 11,247,745 | B2* | 2/2022 | Wada | A61H 3/04 |
| 11,267,388 | B2* | 3/2022 | Raja | B60P 3/423 |
| 11,344,458 | B2* | 5/2022 | Raja | A61G 5/041 |
| 11,351,860 | B2* | 6/2022 | Raja | B60L 15/2036 |
| 2010/0084831 | A1* | 4/2010 | Wang | A61G 5/1089 |
| | | | | 280/39 |
| 2010/0117328 | A1* | 5/2010 | Johnson | A61G 5/045 |
| | | | | 280/288.4 |
| 2013/0192908 | A1 | 8/2013 | Schlagheck | |
| 2020/0008990 | A1* | 1/2020 | Harrison | B62K 5/025 |
| 2020/0268577 | A1* | 8/2020 | Lau | A61G 5/04 |
| 2021/0059879 | A1* | 3/2021 | Raja | A61G 5/0833 |
| 2021/0059880 | A1* | 3/2021 | Raja | A61G 5/041 |
| 2021/0059891 | A1* | 3/2021 | Raja | B62D 51/04 |
| 2021/0145670 | A1* | 5/2021 | Son | A61G 5/1067 |

FOREIGN PATENT DOCUMENTS

| | | |
|---|---|---|
| GB | 2450348 A | 12/2008 |
| GB | 2510334 A | 8/2014 |
| JP | H1085268 A | 4/1998 |
| JP | 2002233007 A | 8/2002 |
| JP | 2003237380 A | 8/2003 |
| JP | 2016168153 A | 9/2016 |

\* cited by examiner

ELECTRIC VEHICLE

CROSS-REFERENCE TO RELATED APPLICATIONS

This application claims the benefit of the filing date of Japanese Patent Application No. 2019-154841, filed on Aug. 27, 2019, the disclosure of which is hereby incorporated herein by reference.

BACKGROUND OF THE INVENTION

Technical Field

The present invention relates to an electric vehicle including a mobile base configured to be capable of traveling by an electromotive drive, a seat having a seating portion, and a back plate configured to be usable as a backrest corresponding to the seating portion.

Background Art

As means of transportation for users, such as the elderly, people in need of care, and/or the like, an electric vehicle, such as an electric-powered wheelchair, an electric-powered cart, or the like that can travel by driving means, such as a motor or the like, is becoming popular. The electric vehicle as above may be called a "mobility scooter". The electric vehicle typically includes a mobile base configured to be capable of traveling by an electromotive drive, a seat having a seating portion, and a back plate configured to be usable as a backrest corresponding to the seating portion, and the user can move in a state of sitting on the seating portion of the seat of the electric vehicle and also leaning on the back plate.

The electric vehicle may be configured to be foldable. Specifically, the electric vehicle may be configured to be changeable between: an unfolded state in which the mobile base is expanded in the front-rear direction such that the user can be in a riding state and stability at the time of travel can be obtained; and a folded state in which the mobile base is contracted in the front-rear direction so as to be suitable for movement caused by pushing the electric vehicle from the rear side of the electric vehicle by hand. The electric vehicle as above is required to be moveable by the pushing with hand while baggage is loaded thereon, particularly, in the folded state. Therefore, various structures for loading baggage in the electric vehicle have been proposed.

An electric vehicle having the structure for loading the baggage, cited as one example of the above electric vehicles, includes: a vehicle body having a front wheel and a rear wheel and configured so as to be capable of expanding and contract a wheelbase; a seat having a seating portion and arranged on the vehicle body; a backrest positioned on the rear side of the seat and formed in an inverted U-shape in front view; a basket permanently installed so as to be capable of receiving baggage and formed to be opened upward in a U-shape in cross section; and one steering wheel that is configured so as to operate the electric vehicle and stay in a fixed position. In the electric vehicle, the seating portion is arranged such that the user can operate one steering wheel when the user is in a state of sitting on the seating portion of the seat, the backrest is arranged so as to rise from the rear side of the seating portion, and the basket is arranged close to the lower side of the vehicle body in the unfolded state of the electric vehicle, and the seating portion and the basket are arranged to be on the upper side with respect to the positions in the unfolded state and the backrest is laid down on the seating portion in the folded state of the electric vehicle (for example, see Japanese Patent Publication JP 2016-168153 A).

SUMMARY OF THE INVENTION

Technical Problem

However, in the one example of the electric vehicle described above, the basket for receiving the baggage is permanently installed, and the installation space for the basket as above upsizes the electric vehicle. In particular, from the viewpoint of improving the sharp-turn performance of the electric vehicle, the up sizing of the electric vehicle is a problem. When the basket is downsized by taking the downsizing of the electric vehicle into consideration, the receiving space for the baggage cannot be sufficiently secured. In this case, in particular, it becomes difficult to stably load a shopping basket with rigidity, which is placed in a supermarket, a shopping center, or the like, on the electric vehicle, and it becomes difficult to stably transport the shopping basket by the electric vehicle.

In one example of the electric vehicle described above, a usage in which the electric vehicle is moved by pushing the electric vehicle by hand while baggage, such as the shopping basket or the like is loaded on the seating portion of the electric vehicle in the unfolded state, is conceived. However, the baggage on the seating portion cannot be stably held and the baggage cannot be stably transported, depending on the electric vehicle in the unfolded state. There is a problem in that the electric vehicle in the unfolded state is large in size, and there is a problem that it is difficult for the electric vehicle in the unfolded state to make sharp turns. On the whole, it is also important to improve the convenience of the electric vehicle.

Accordingly, in the electric vehicle, it is desired that the electric vehicle can be downsized, and that the baggage can be stably loaded and transported. In the electric vehicle, it is desired that the convenience can be improved.

Solution to the Problem

To solve the problems as described above, an electric vehicle according to one aspect includes: a mobile base configured to be capable of traveling by an electromotive drive; a seat arranged on the mobile base and including a seating portion having a sitting surface; and a back plate arranged on the mobile base and configured to be usable as a backrest corresponding to the seating portion, the mobile base includes: a front base having a front wheel; and a rear base arranged closer to a rear of the vehicle than to the front base and having a rear wheel, the front and rear bases are configured to be moveable relative to each other such that the mobile base is changeable between an expanded state in which a wheelbase between the front wheel and the rear wheel is expanded, and a contracted state in which the wheelbase is more contracted than in the expanded state, the seat is configured to be moveable between a sitting position in which the sitting surface is arranged so as to be directed to an upper of the vehicle, and a retracted position in which the seating portion is retracted from the sitting position to a vehicle front side, the seat is configured so as to be arrangeable in the sitting position in the expanded state and is arrangeable in the retracted position in the contracted state, the back plate is configured to be moveable between a raised position closer to the rear of the vehicle and the upper of the vehicle than to the seating portion in the sitting position, and a laid down position closer a front of the vehicle than the raised position, the back plate is arrangeable in the raised position in a state in which the seat is arranged in the sitting position, and is arrangeable in the laid down position in a state in which the seat is arranged in the retracted position, the mobile base includes a cargo bed portion configured such that baggage is loadable therein from the upper of the vehicle, the cargo bed portion is positioned closer to the lower of the vehicle than to the seating portion of the seat in the sitting position, and is positioned closer to the rear of the vehicle than to the seating portion of the seat in the retracted position, and the back plate has a through hole formed so as to face at least a part of the cargo bed portion in a vehicle upper-lower direction in a state in which the back plate is in the laid down position.

Advantageous Effects of Invention

In the electric vehicle according to one aspect, the electric vehicle can be downsized, the user can stably ride the electric vehicle, and the baggage can be stably loaded and transported. In the electric vehicle, the convenience can be improved.

DETAILED DESCRIPTION

An electric vehicle according to an Embodiment will be described below. The electric vehicle according to this Embodiment is a single-seater vehicle, and the electric vehicle is configured such that a seat installed thereon is opened to the outside of the electric vehicle. For example, the electric vehicle may be an electric-powered wheelchair, an electric-powered cart, or the like, and the electric vehicle particularly may be a single-seater electric-powered wheelchair, a single-seater electric-powered cart, or the like. However, the electric vehicle is not limited to those configurations. The electric vehicle is simply called a "vehicle" below, as necessary.

In the drawings used to explain this Embodiment, directions defined based on the vehicle, are indicated as follows. In other words, the vehicle front side and the vehicle rear side are indicated by a single-headed arrow F and a single-headed arrow R respectively. Therefore, the vehicle front-rear direction is indicated by the single-headed arrow F and the single-headed arrow R. The vehicle width direction is indicated by a double-headed arrow W. The vehicle upper side and the vehicle lower side are indicated by a single-headed arrow U and a single-headed arrow L respectively. Therefore, the vehicle upper-lower direction is indicated by the single-headed arrow U and the single-headed arrow L.

Outline of Electric Vehicle

The outline of the electric vehicle according to an Embodiment will be described. As shown in FIGS. 1 to 4, the vehicle includes a mobile base 10 configured to be capable of traveling by an electromotive drive. The vehicle includes one seat 20 arranged on the mobile base 10. The seat 20 includes a seating portion 22 having a sitting surface 21 configured such that the user can sit thereon. In particular, the seat 20 may be for one person. However, the seat of the vehicle is not limited to the above.

Directions with respect to the seat 20 are defined as follows. The sitting surface 21 side of the seat 20 is defined as a "seat upper side". The side opposite to the sitting surface 21 of the seat 20, that is to say, the side opposite to the "seat upper side" is defined as the "seat lower side". A "seat upper-lower direction" is defined based on the "seat upper side" and the "seat lower side". The front surface side of the seating portion 22 of the seat 20 is defined as a "seat front side". The rear surface side of the seating portion 22 of the seat 20, that is to say, the side opposite to the "seat front side" is defined as a "seat rear side". A "seat front-rear direction" is defined based on the "seat front side" and the "seat rear side". The direction orthogonal to the "seat upper-lower direction" and the "seat front-rear direction" is defined as a "seat width direction". The "seat width direction" substantially may match with the vehicle width direction.

The vehicle includes a back plate 30 configured to be usable as a backrest corresponding to the seating portion 22. The back plate 30 is arranged on the mobile base 10.

The mobile base 10 includes two front wheels 11, and two rear wheels 12 positioned so as to be spaced apart from those front wheels 11 to the vehicle rear side. The front wheels 11 and the rear wheels 12 are traveling wheels of the vehicle. However, the mobile base only needs to include at least one front wheel and two or more rear wheels, or include two or more front wheels and at least one rear wheel.

Figure 1:
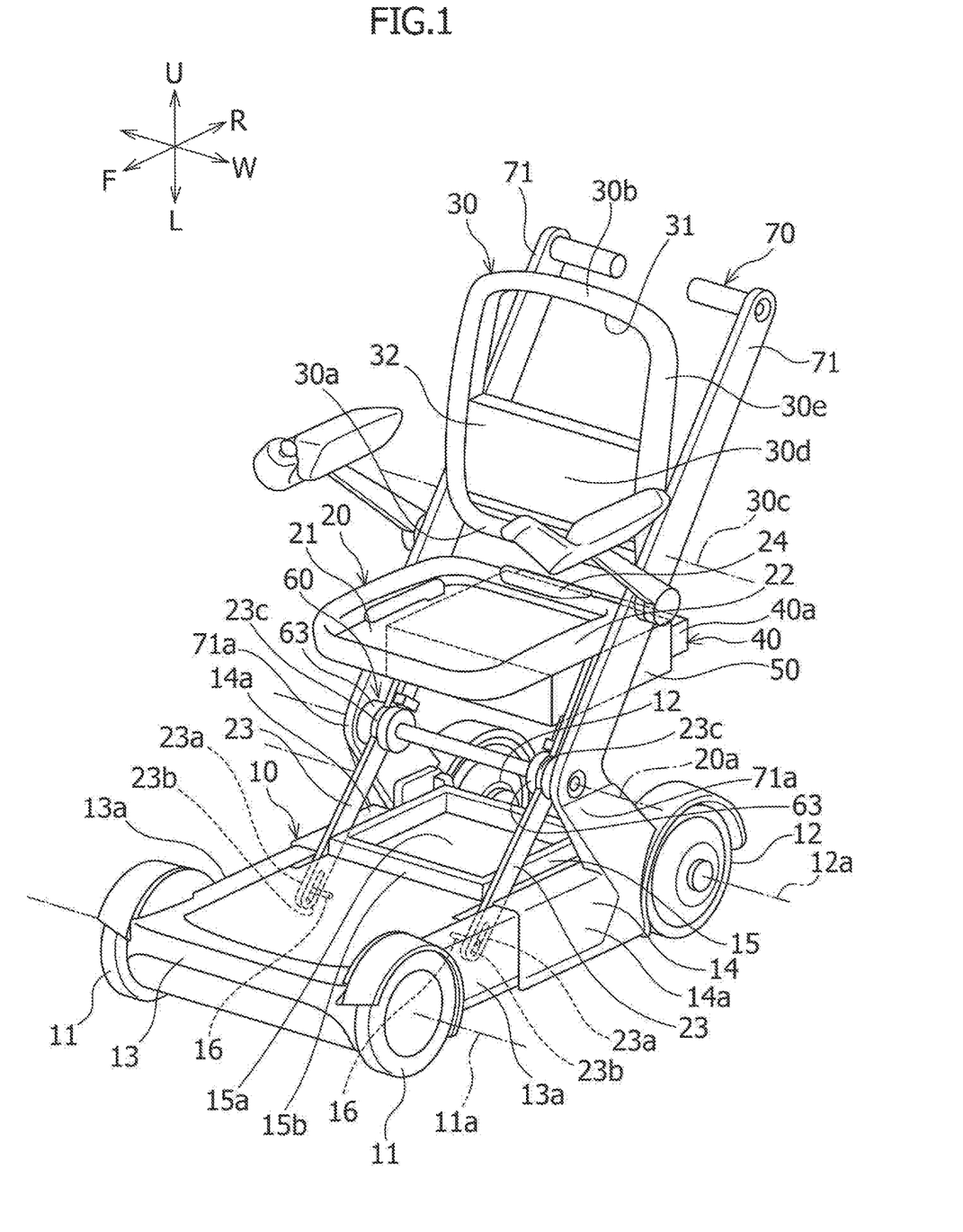
FIG. 1 is a front perspective view schematically showing an electric vehicle according to an Embodiment in an unfolded state.
Figure 2:
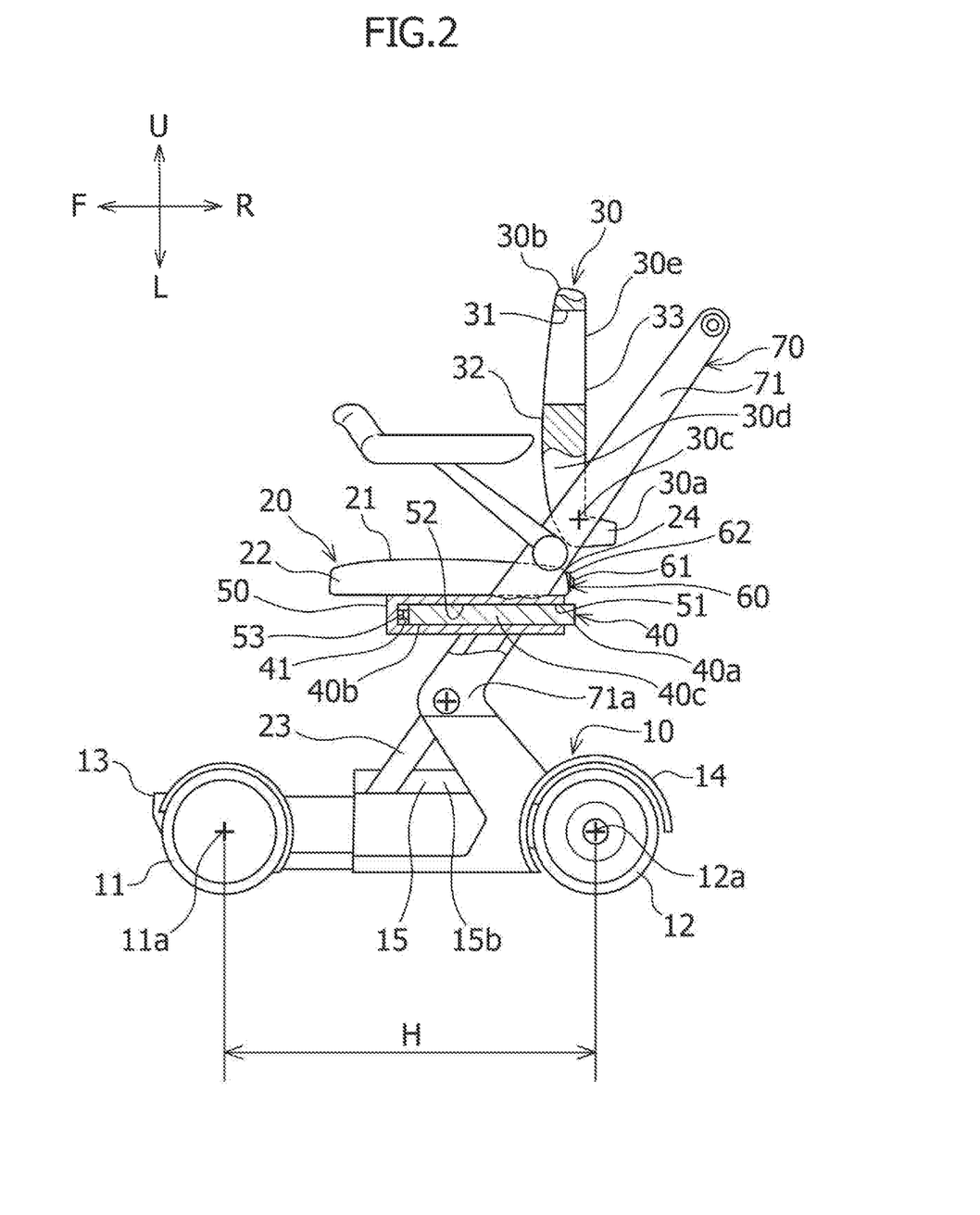
FIG. 2 is a side view schematically showing the electric vehicle according to the Embodiment in the unfolded state in a partially cross-sectional view.
Figure 3:
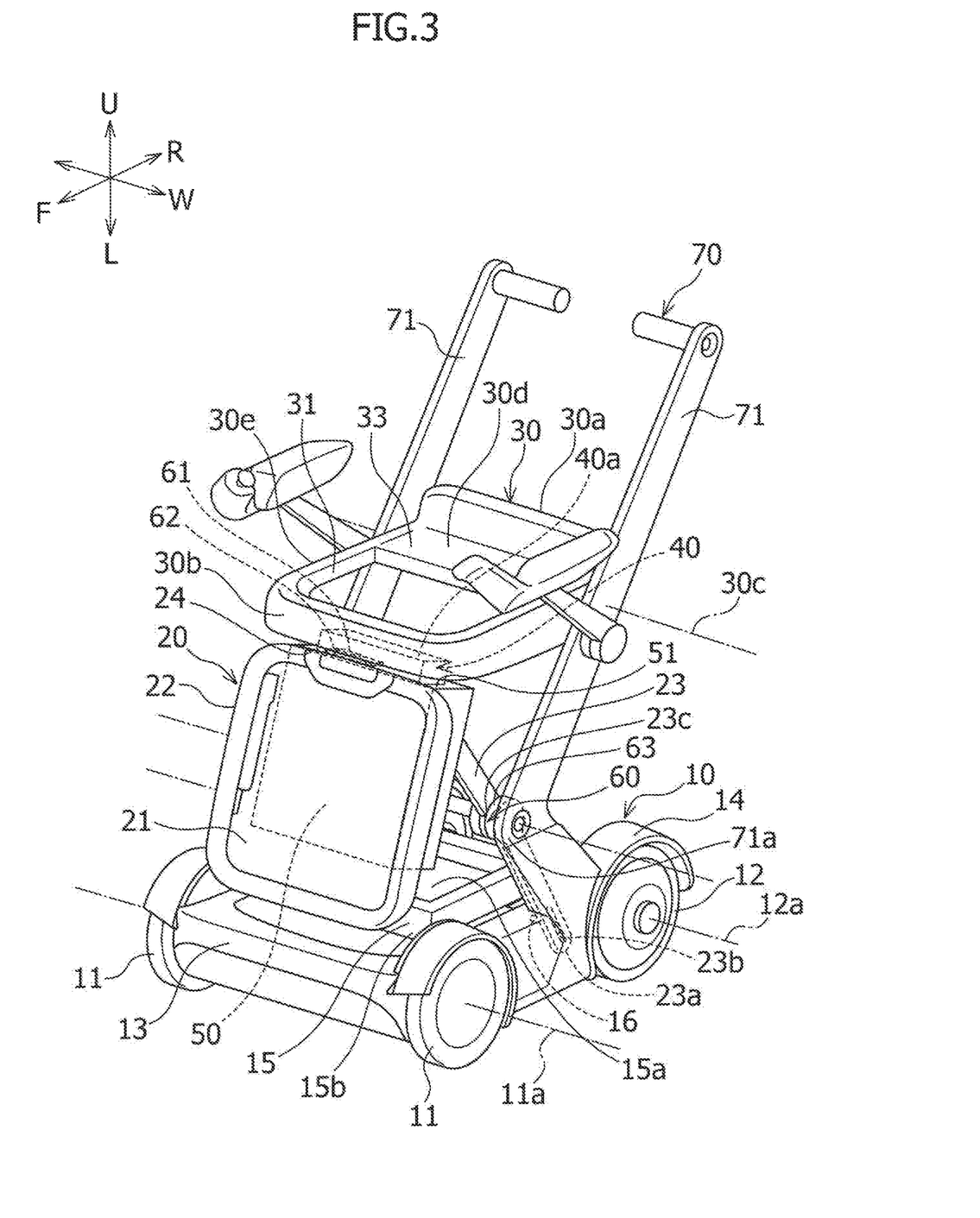
FIG. 3 is a front perspective view schematically showing the electric vehicle according to the Embodiment in a folded state.
Figure 4:
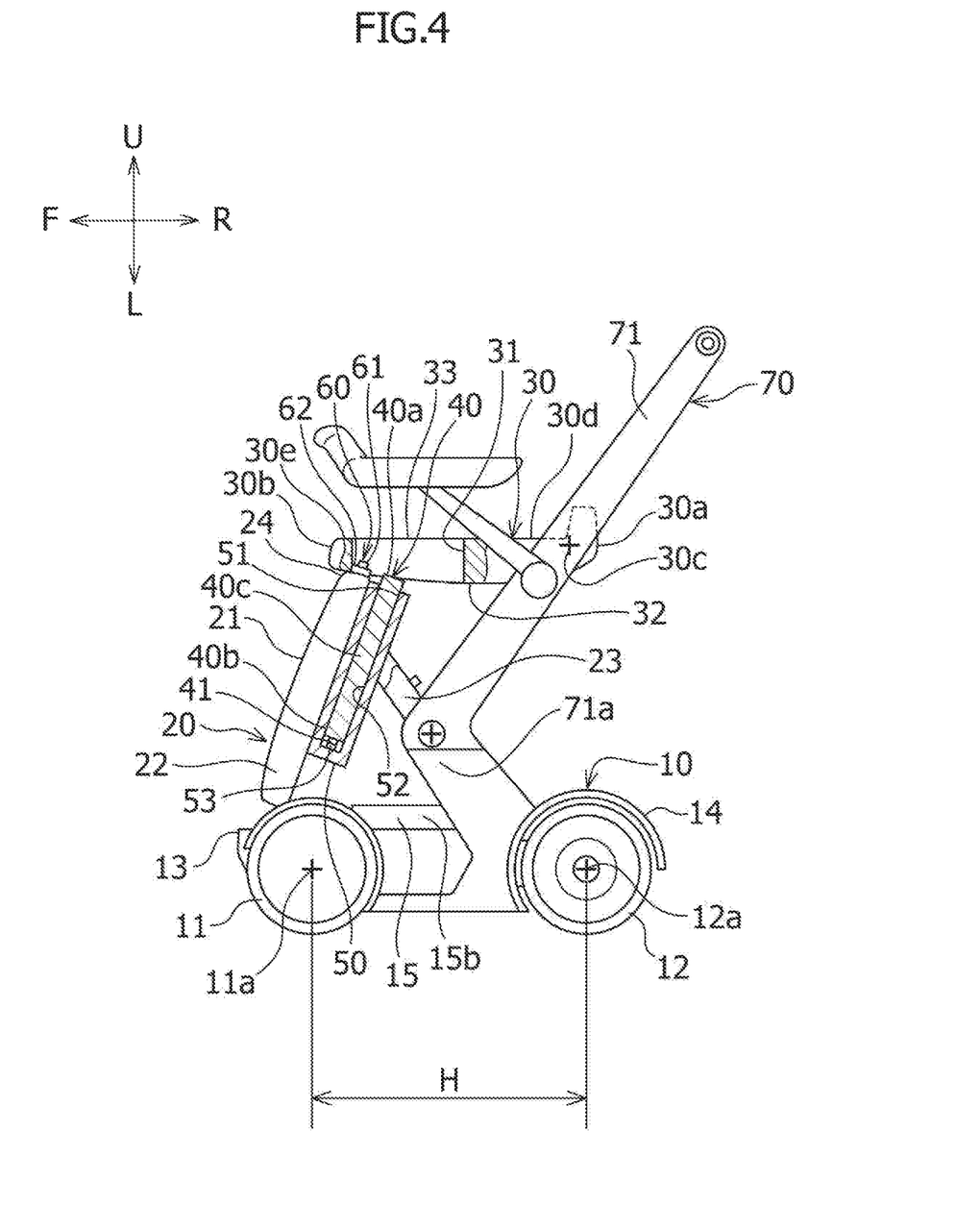
FIG. 4 is a side view schematically showing the electric vehicle according to the Embodiment in the folded state in a partially cross-sectional view.

The mobile base 10 includes a front base 13 having the front wheels 11 and a rear base 14 having the rear wheels 12. The rear base 14 is arranged on the vehicle rear side with respect to the front base 13. The front and rear bases 13 and 14 are configured to be moveable relative to each other so as to be changeable between the expanded state and the contracted state of the mobile base 10. As shown in FIGS. 1 and 2, the expanded state of the mobile base 10 is a state in which a wheelbase H between the front wheels 11 and the rear wheels 12 of the mobile base 10 is expanded. As shown in FIGS. 3 and 4, the contracted state of the mobile base 10 is a state in which the wheelbase H is more contracted than in the expanded state.

As shown in FIGS. 1 to 4, the seat 20 is configured to be moveable between a sitting position and a retracted position. As shown in FIGS. 1 and 2, the sitting position of the seat 20 is a position in which the seat 20 is arranged such that the sitting surface 21 faces the vehicle upper side. The seat 20 can be arranged in the sitting position in the expanded state of the mobile base 10. As shown in FIGS. 3 and 4, the retracted position of the seat 20 is a position in which the seat 20 is arranged such that the seating portion 22 is retracted from the sitting position to the vehicle front side. The seat 20 can be arranged in the retracted position in the contracted state of the mobile base 10.

As shown in FIGS. 1 to 4, the back plate 30 is configured to be moveable between a raised position and a laid down position. As shown in FIGS. 1 and 2, the raised position of the back plate 30 is a position in which the back plate 30 is arranged on the vehicle rear side and the vehicle upper side with respect to the seating portion 22 in the sitting position. The back plate 30 can be arranged in the raised position in a state in which the seat 20 is arranged in the sitting position. As shown in FIGS. 3 and 4, the laid down position of the back plate 30 is a position in which the back plate 30 is laid down to the vehicle front side with respect to the raised position. The back plate 30 can be arranged in the laid down position in a state in which the seat 20 is arranged in the retracted position.

As shown in FIGS. 1 to 4, the mobile base 10 includes a cargo bed portion 15 configured such that baggage is loadable therein from the vehicle upper side. The cargo bed portion 15 is positioned on the vehicle lower side with respect to the seating portion 22 of the seat 20 in the sitting position. The cargo bed portion 15 is positioned on the vehicle rear side with respect to the seating portion 22 of the seat 20 in the retracted position. The back plate 30 has a through hole 31 formed so as to face at least a part of the cargo bed portion 15 in the vehicle upper-lower direction in a state in which the back plate 30 is in the laid down position.

The electric vehicle according to this Embodiment may be schematically configured as follows. As shown in FIGS. 1 to 4, the vehicle includes a battery 40 configured to be capable of supplying electric power used in the electromotive drive. The seating portion 22 of the seat 20 includes a receiving portion 50 configured so as to be capable of receiving the battery 40. The receiving portion 50 is arranged on the seat lower side with respect to the sitting surface 21 of the seat 20.

The receiving portion 50 has an opening 51 formed such that the battery 40 is receivable in the receiving portion 50 and the battery 40 is removable from the receiving portion 50. The opening 51 is provided in a rear-end portion of the seating portion 22 in the seat front-rear direction. The through hole 31 in the back plate 30 is formed so as to correspond to the opening 51 in the receiving portion 50 of the seating portion 22 in the seat 20 and be capable of passing the battery 40 therethrough in a state in which the seat 20 is in the retracted position and the back plate 30 is in the laid down position.

Figure 5:
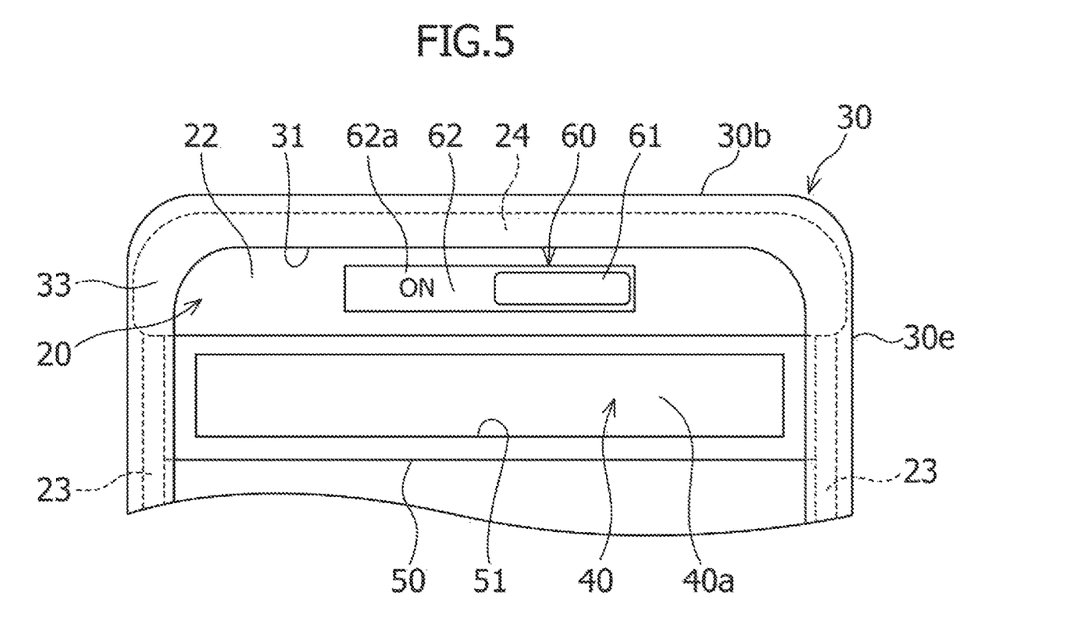
FIG. 5 is a schematic view of a lock switch in an OFF state, positioned on a rear end of a seating portion of a seat, seen from a through hole in a back plate in the folded state of the electric vehicle according to the Embodiment.
Figure 6:
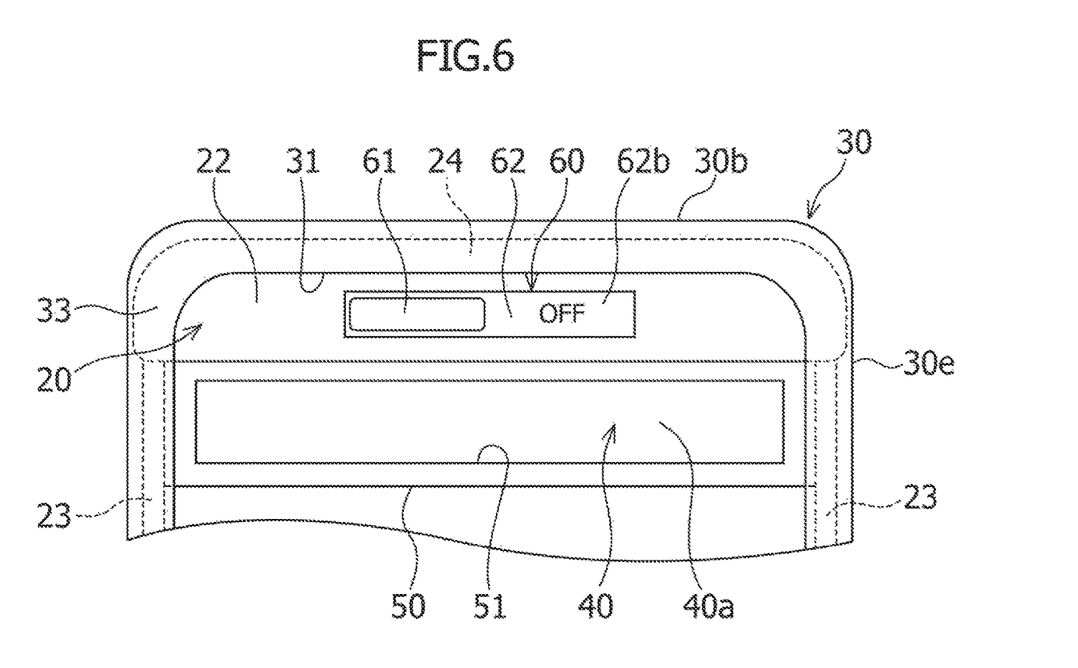
FIG. 6 is a schematic view of the lock switch in an ON state, positioned on the rear end of the seating portion of the seat, seen from the through hole in the back plate in the folded state of the electric vehicle according to the Embodiment.

As shown in FIGS. 1 to 6, the vehicle includes a lock apparatus 60 configured to be capable of locking the relative movement of the front and rear bases 13 and 14 at least in the contracted state of the mobile base 10. As shown in FIGS. 2 to 5, the lock apparatus 60 includes a switch 61 configured to be capable of switching the lock apparatus 60 between a locked state and an unlocked state. The switch 61 is arranged in the rear-end portion of the seating portion 22 of the seat 20. As shown in FIGS. 5 and 6, the through hole 31 in the back plate 30 is further formed so as to correspond to the switch 61 and be capable of visually recognizing the switch 61 through the through hole 31 in the back plate 30 in a state in which the seat 20 is in the retracted position and the back plate 30 is in the laid down position.

As shown in FIGS. 1 to 6, the lock apparatus 60 includes a display unit 62 that can separately display the locked state and the unlocked state of the lock apparatus 60. The display unit 62 is arranged on the rear-end portion of the seating portion 22 of the seat 20. As shown in FIGS. 5 and 6, the through hole 31 in the back plate 30 is further formed so as to correspond to the display unit 62 and be capable of visually recognizing the display unit 62 through the through hole 31 in the back plate 30 in a state in which the seat 20 is in the retracted position and the back plate 30 is in the laid down position.

Details of Mobile Base

In detail, the mobile base 10 may be configured as follows. As shown in FIGS. 1 to 4, in the mobile base 10, to expand and contract the wheelbase H, the rear wheels 12 are driven and the front wheels 11 are stopped. In other words, when the wheelbase H is expanded, the rear wheels 12 are rotatably driven so as to move the rear base 14 to the vehicle rear side, and the front wheels 11 are stopped so as to keep the front base 13 at a fixed position. When the wheelbase H is contracted, the rear wheels 12 are rotatably driven so as to move the rear base 14 to the vehicle front side, and the front wheels 11 are stopped so as to keep the front base 13 at a fixed position.

However, the mobile base may be configured so as to drive the front wheels and stop the rear wheels in order to expand and contract the wheelbase. The mobile base may be configured such that the front wheels and the rear wheels are driven in an inverted manner with respect to each other in order to expand and contract the wheelbase.

The front and rear bases 13 and 14 of the mobile base 10 can substantially slide linearly relative to each other in the vehicle front-rear direction. In an overlapping region between the front and rear bases 13 and 14, the front base 13 can be positioned on the vehicle lower side with respect to the rear base 14. When the front and rear bases 13 and 14 move relative to each other, the front base 13 can pass through the inner portion of the rear base 14 in a base overlapping region 10a.

The difference in the length of the wheelbase H between the expanded state and the contracted state of the mobile base 10 may be equal to or greater than a half of the maximum length of the seat 20 in the seat front-rear direction and equal to or less than the same maximum length. The vehicle can stably travel while stably supporting the user that is riding when the mobile base 10 is in the expanded state, and the vehicle can be compact and make sharp turns when the mobile base 10 is in the contracted state.

The front base 13 of the mobile base 10 includes two front side members 13a arranged so as to be spaced apart from each other in the vehicle width direction. The two front wheels 11 are attached to front-end portions of the two front side members 13a in the vehicle front-rear direction so as to be rotatable about a rotation axis 11a extending in the vehicle width direction.

Each of the front side members 13a includes a turning shaft 16 formed so as to protrude to the vehicle width direction from a rear-end portion of the front side member 13a in the vehicle front-rear direction. Although details are described below, leg portions 23 of the seat 20 are attached to the turning shafts 16 respectively. The turning shafts 16 are arranged so as to avoid interference with the rear base 14 when the front and rear bases 13 and 14 move relative to each other.

As shown in FIG. 1, the turning shafts 16 may be positioned in front-end portions of rear side members 14a described next in the vehicle front-rear direction in the expanded state of the mobile base 10. As shown in FIG. 3, the turning shafts 16 may be respectively positioned near the rear wheels 12 in the contracted state of the mobile base 10.

As shown in FIGS. 1 and 3, the rear base 14 of the mobile base 10 includes the two rear side members 14a arranged to be spaced apart from each other in the vehicle width direction. The two rear wheels 12 are attached to rear-end portions of the two rear side members 14a in the vehicle front-rear direction respectively so as to be rotatable about a rotation axis 12a extending in the vehicle width direction.

Although not particularly shown in a clear manner, a braking apparatus configured so as to be capable of braking the two front wheels 11 is mounted in the front base 13 of the mobile base 10. Driving motors for rotatably driving the rear wheels 12, respectively, are mounted on the rear base 14 of the mobile base 10. For example, the driving motors are arranged so as to be adjacent to the rear wheels 12 in the vehicle width direction, respectively, or the driving motors are built in the rear wheels 12, respectively. However, the driving motors are not limited thereto.

In the vehicle as above, the braking apparatus, a control apparatus, and the driving motors are electrically connected to the battery 40. The battery 40 can supply electric power to the braking apparatus, the control apparatus, and the driving motors. The control apparatus is connected to the braking apparatus and the driving motors. The control apparatus can control the battery 40 and the driving motors.

Details of Cargo Bed Portion

In detail, the cargo bed portion 15 provided on the mobile base 10, may be configured as follows. As shown in FIGS. 1 to 4, the cargo bed portion 15 is arranged on the rear base 14 of the mobile base 10. The cargo bed portion 15 has a loading surface 15a arranged along the horizontal direction of the vehicle. As shown in FIG. 3, the through hole 31 in the back plate 30 is formed so as to face at least a part of the loading surface 15a in the vehicle upper-lower direction in a state in which the back plate 30 is in the laid down position.

The cargo bed portion 15 has peripheral walls 15b protruding to the vehicle upper side from outer peripheral edges of the loading surface 15a. By the peripheral walls 15b, the baggage loaded on the loading surface 15a of the cargo bed portion 15, can be prevented from falling from the vehicle when the vehicle moves, for example.

Details of Seat

In detail, the seat 20 may be configured as follows. As shown in FIGS. 1 to 4, the seat 20 further includes the two leg portions 23 that support the seating portion 22. The two leg portions 23 are arranged so as to be spaced apart from each other in the seat width direction. However, the seat may be configured so as to include at least one leg portion.

In the seat 20, the seating portion 22 moves to the vehicle front side by the movement of the leg portions 23 in accordance with the relative movement of the front and rear bases 13 and 14 in the vehicle front-rear direction for contracting the wheelbase H. The seating portion 22 moves to the vehicle rear side by the movement of the leg portions 23 in accordance with the relative movement of the front and rear bases 13 and 14 in the vehicle front-rear direction for expanding the wheelbase H.

As shown in FIGS. 1 and 2, the seating portion 22 is arranged in the sitting position in the expanded state of the mobile base 10. The seat 20 may be arranged such that the sitting surface 21 of the seating portion 22 is substantially along the vehicle horizontal direction in a state in which the seat 20 is in the sitting position. As shown in FIGS. 3 and 4, the seat 20 is arranged in the retracted position in the contracted state of the mobile base 10. The seat 20 can be arranged such that the sitting surface 21 of the seating portion 22 faces a plane extending in the vehicle upper-lower direction and the vehicle width direction at a predetermined angle in a state in which the seat 20 is in the retracted position. The absolute value of the angle is approximately 30 degrees or less. However, the angle of the sitting surface is not limited thereto.

As shown in FIGS. 1 to 4, a front-end zone of the seating portion 22 in the seat front-rear direction is a free end. In a state in which the seat 20 is in the sitting position, the front-end zone of the seating portion 22 is positioned on the vehicle front side with respect to a rear-end zone of the seating portion 22 in the seat front-rear direction, and the rear-end zone of the seating portion 22 is positioned so as to substantially match with a frame 70 in the vehicle front-rear direction. In a state in which the seat 20 is in the retracted position, the rear-end zone of the seating portion 22 is positioned on the vehicle upper side with respect to the front-end zone of the seating portion 22, and is positioned to be spaced apart from the frame 70 to the vehicle front side.

The seat 20 includes a back-plate support mechanism 24 configured so as to support the back plate 30 in a state in which the seat 20 and the back plate 30 are in the retracted position and the laid down position respectively. The back-plate support mechanism 24 is the rear-end zone of the seating portion 22 in the seat front-rear direction. However, the present invention is not limited thereto.

The leg portions 23 extend so as to incline toward the seat front side from the seat rear side as the leg portions 23 approach the seat lower side from the seat upper side. The leg portions 23 may respectively extend to the seat lower side from side end zones of the seating portion 22 in the seat width direction corresponding to the leg portions 23, respectively.

The leg portions 23 include base attachment zones 23a configured so as to attach the leg portions 23 to the front base 13, respectively. The base attachment zones 23a are attached to the turning shafts 16 of the front side members 13a, respectively, so as to be capable of turning. More specifically, the base attachment zones 23a respectively have long holes 23b that are through holes in the vehicle width direction so that the turning shafts 16 can be inserted therein, respectively. The long holes 23b extend along the longitudinal direction of the leg portions 23, respectively. When the front base 13 moves to the vehicle front-rear direction with respect to the rear base 14, the turning shafts 16 move in the long holes 23b along the longitudinal direction of the long holes 23b, respectively.

The leg portions 23 respectively include frame attachment zones 23c configured such that the leg portions 23 are attached to the frame 70 so as to be capable of turning with respect to the frame 70. The frame attachment zones 23c are positioned between the seating portion 22 and the base attachment zones 23a. The base attachment zones 23a of the leg portions 23 may be positioned on lower ends of the leg portions 23 in the seat upper-lower direction respectively, and the frame attachment zones 23c of the leg portions 23 may be positioned in the middle of the leg portions 23 in the seat upper-lower direction, respectively.

In the seat 20 as above, the vehicle-front-side movement of the seating portion 22 is provided by the vehicle-rear-side movement of the base attachment zones 23a of the leg portions 23 and the vehicle-front-side turning of the leg portions 23 in accordance with the relative movement of the front and rear bases 13 and 14 in the vehicle front-rear direction for contracting the wheelbase H. The seating portion 22 can move to the retracted position from the sitting position by the vehicle-front-side movement.

By the relative movement of the front and rear bases 13 and 14 in the vehicle front-rear direction for expanding the wheelbase H, the vehicle-front-side movement of the base attachment zones 23a of the leg portions 23 and the vehicle-rear-side turning of the leg portions 23, are provided. As a result, the vehicle-rear-side movement of the seating portion 22 is provided. The seat 20 can move to the sitting position from the retracted position by the vehicle-rear-side movement.

Details of Back Plate

In detail, the back plate 30 may be configured as follows. As shown in FIGS. 1 to 4, the back plate 30 is attached to the frame 70 so as to be capable of turning between the raised position and the laid down position. The back plate 30 in the laid down position is positioned on the vehicle front side and the vehicle lower side with respect to the back plate 30 in the raised position. As shown in FIGS. 1 and 2, the back plate 30 is arranged such that a front surface 32 of the back plate 30 faces the vehicle front side in a state in which the back plate 30 is in the raised position. As shown in FIGS. 3 and 4, the back plate 30 is arranged such that the rear surface 33 of the back plate 30 faces the vehicle lower side in a state in which the back plate 30 is in the laid down position. Note that the rear surface 33 of the back plate 30 is a surface on the side opposite to the front surface 32 of the back plate 30.

As shown in FIGS. 1 to 4, the back plate 30 is formed in a substantially flat-plate-like shape. The back plate 30 has a base-end portion 30a and a distal-end portion 30b positioned on the lower end side and the upper end side in the vehicle upper-lower direction, respectively, in a state in which back plate 30 is in the raised position. The base-end portion 30a of the back plate 30 is attached to two support rods 71 of the frame 70 described below such that the back plate 30 can turn about a turning axis 30c extending in the vehicle width direction. More specifically, the base-end portion 30a of the back plate 30 is attached to intermediate portions of the two support rods 71 in the vehicle upper-lower direction.

The distal-end portion 30b of the back plate 30 is a free end. The distal-end portion 30b of the back plate 30 can swing about the turning axis 30c between the raised position and the laid down position. As shown in FIGS. 3 and 4, in a state in which the seat 20 is in the retracted position and the back plate 30 is in the laid down position, the distal-end portion 30b of the back plate 30 is supported by the back-plate support mechanism 24 of the leg portions 23 of the seat 20.

The through hole 31 in the back plate 30 described above passes through the back plate 30 between the front surface 32 and the rear surface 33 thereof. The through hole 31 is formed so as to pass through a distal-end-side region 30e positioned on the distal-end portion 30b side of the back plate 30. When the user leans on the back plate 30 in the raised position, the back of the user normally abuts a base-end-side region 30d positioned on the base-end portion 30a side of the back plate 30 and the front surface 32 of the back plate 30. Therefore, even when the through hole 31 is formed in the back plate 30, the back plate 30 can fulfill the function as the backrest.

Details of Receiving Portion

In detail, the receiving portion 50 provided on the seating portion 22 of the seat 20 may be configured as follows. As shown in FIGS. 2 and 4, the receiving portion 50 has a cavity 52 depressed from the opening 51 toward the seat front side. The cavity 52 is formed such that the battery 40 is receivable in the receiving portion 50 and the battery 40 is removable from the receiving portion 50 by the movement of the battery 40 in the seat front-rear direction. The cavity 52 may be formed so as to correspond to a front-end portion 40b and an intermediate portion 40c of the battery 40 in the seat front-rear direction described below. As shown in FIGS. 2 and 4, the receiving portion 50 further has a connection terminal 53 that can be electrically connected to a connection terminal 41 of the battery 40.

Details of Battery

In detail, the battery 40 may be configured as follows. Although not particularly shown in a clear manner, the battery 40 includes a rechargeable secondary cell. As shown in FIGS. 2 and 4, the battery 40 has the connection terminal 41 that can be electrically connected to the connection terminal 53 of the receiving portion 50. As shown in FIGS. 1 to 4, the battery 40 is received in the receiving portion 50 in a state in which a rear-end portion 40a thereof in the seat front-rear direction protrudes to the seat rear side from the opening 51 in the receiving portion 50. The front-end portion 40b and the intermediate portion 40c of the battery 40 in the seat front-rear direction can be received in the cavity 52 of the receiving portion 50.

Details of Lock Apparatus

In detail, the lock apparatus 60 may be configured as follows. As shown in FIGS. 1 and 3, the lock apparatus 60 is configured to be capable of locking the relative movement of the front and rear bases 13 and 14 in the expanded state of the mobile base 10 in addition to the contracted state of the mobile base 10. In a vehicle in which the relative movement of the front and rear bases 13 and 14 and the movement of the seat 20 are interlocked, the lock apparatus 60 includes lock mechanisms 63 that regulate the relative movement between the leg portions 23 of the seat 20 and the frame 70 fixed on the mobile base 10. The lock mechanisms 63 are provided on the frame attachment zones 23c of the leg portions 23 respectively. Although not particularly shown in a clear manner, the lock mechanisms 63 are coupled to the switch 61 by mechanical interlocking means.

However, the lock mechanism may be configured so as to directly regulate the relative movement of the front and rear bases. The lock mechanisms may also be coupled to the switch by electrical interlocking means.

The switch 61 of the lock apparatus 60 is moveable between an ON position for placing the lock mechanisms 63 in the locked state as shown in FIG. 5 and an OFF position for placing the lock mechanisms 63 in the unlocked state as shown in FIG. 6. As shown in FIGS. 5 and 6, when the switch 61 is moved from the OFF position to the ON position, the lock mechanisms 63 are placed in the locked state from the unlocked state by the interlocking means (not shown). When the switch 61 is moved from the ON position to the OFF position, the lock mechanisms 63 are placed in the unlocked state from the locked state by the interlocking means (not shown). In particular, when the interlocking means are mechanical, the switch 61 may be configured to be moveable in a sliding manner. However, the switch is not limited thereto.

As shown in FIG. 5, the display unit 62 of the lock apparatus 60 includes an ON-display zone 62a displaying that the lock apparatus 60 is, that is to say, the lock mechanisms 63 are in the locked state, and an OFF-display zone 62b displaying that the lock apparatus 60 is, that is to say, the lock mechanisms 63 are in the unlocked state. In FIG. 5, characters indicating "ON" are shown in the ON-display zone 62a. In the locked state of the lock apparatus 60, the ON-display zone 62a is hidden by the switch 61. In FIG. 6, characters indicating "OFF" are shown in the OFF-display zone 62b. In the unlocked state of the lock apparatus 60, the OFF-display zone 62b is hidden by the switch 61. In other words, the switching between the ON display and the OFF display of the display unit 62 is mechanically interlocked with the movement of the switch 61 between the ON position and the OFF position.

However, the display unit may separately indicate the ON display and the OFF display at a position separated from the switch. The switching between the ON display and the OFF display of the display unit may be electrically interlocked with the movement of the switch between the ON position and the OFF position.

Details of Frame

In detail, the frame 70 may be configured as follows. As shown in FIGS. 1 and 2, the frame 70 is arranged so as to be adjacent to the rear-end zone of the seating portion 22 of the seat 20 in the sitting position. The frame 70 includes the two support rods 71 arranged to be spaced apart from each other in the vehicle width direction. The two support rods 71 are arranged so as to correspond to the two rear side members 14a of the rear base 14 in the vehicle width direction, respectively. The two support rods 71 are arranged so as to correspond to the two leg portions 23 of the seat 20 in the vehicle width direction, respectively.

Lower end portions of the support rods 71 in the vehicle upper-lower direction are respectively attached to rear-end portions of the rear side members 14a in the vehicle front-rear direction corresponding to the support rods 71, respectively. The support rods 71 respectively include seat turning attachment portions 71a configured such that the frame attachment zones 23c of the leg portions 23 of the seat 20 corresponding to the support rods 71 respectively, may be attached thereto, respectively. The frame attachment zones 23c are attached to the seat turning attachment portions 71a respectively so as to be capable of turning about a turning axis 20a extending in the vehicle width direction.

The seat turning attachment portions 71a are arranged on a front end and a rear end of the rear base 14 in the vehicle front-rear direction, respectively. In particular, as shown in FIGS. 1 and 2, the seat turning attachment portions 71a may be respectively arranged on lower-side regions of the support rods 71 in the vehicle upper-lower direction, positioned on the vehicle lower side with respect to the seating portion 22 of the seat 20 in the sitting position. The lower-side regions of the support rods 71 may be formed in a bending manner so as to protrude toward the vehicle front side in substantially triangular shapes. In this case, the seat turning attachment portions 71a may be respectively positioned at apex portions of the lower-side regions protruding toward the vehicle front side in substantially triangular shapes, respectively.

Unfolded State and Folded State of Electric Vehicle

The unfolded state and the folded state of the electric vehicle will be described. As shown in FIGS. 1 and 2, the vehicle is in the unfolded state when the mobile base 10 is in the expanded state, the seat 20 is in the sitting position, and the back plate 30 is in the raised position. When the vehicle is in the unfolded state, the vehicle can travel while the user is riding the vehicle. When the vehicle is in the unfolded state, the vehicle can also travel when the user, an assistant, and/or the like pushes the vehicle by hand while being on the vehicle rear side thereof. The vehicle in the unfolded state may be used as a wheelchair, a cart, and/or the like.

As shown in FIGS. 3 and 4, the vehicle is in the folded state when the mobile base 10 is in the contracted state, the seat 20 is in the retracted position, and the back plate 30 is in the laid down position as described above. When the vehicle is in the folded state, the vehicle can travel when the user pushes the vehicle by hand while being on the vehicle rear side thereof. The vehicle in the folded state may be used as a walking assistance vehicle, a shopping cart, a hand cart, and/or the like.

Method for Attaching and Removing Battery

A method for attaching and removing the battery 40 will be described. First, an operation for receiving the battery 40 in the receiving portion 50 will be described. In the unfolded state of the vehicle, the battery 40 can be received in the receiving portion 50 through the opening 51 while moving from the vehicle rear side toward the vehicle front side. In the folded state of the vehicle, the battery 40 can be received in the receiving portion 50 through the opening 51 after passing through the through hole 31 in the back plate 30 while moving from the vehicle upper side toward the vehicle lower side.

Next, an operation of removing the battery 40 from the receiving portion 50 will be described. In the unfolded state of the vehicle, the battery 40 can be removed from the receiving portion 50 through the opening 51 while moving from the vehicle front side toward the vehicle rear side. In the folded state of the vehicle, the battery 40 can be removed from the receiving portion 50 through the through hole 31 in the back plate 30 after passing through the opening 51 while moving from the vehicle lower side toward the vehicle upper side.

Method for Operating Lock Apparatus in Folded State of Electric Vehicle

A method for operating the lock apparatus 60 in the folded state of the electric vehicle will be described. In the folded state of the electric vehicle, the seat 20 is in the retracted position and the back plate 30 is in the laid down position.

In the folded state of the electric vehicle as above, the lock apparatus 60 is switched from the unlocked state to the locked state as below. The user moves the switch 61 from the OFF position to the ON position by his or her hand while putting the hand through the through hole 31 in the back plate 30. By the movement of the switch 61, the lock mechanisms 63 can be switched from the unlocked state to the locked state, and the display unit 62 interlocked with the movement of the switch 61 is switched from the OFF display to the ON display.

In the folded state of the electric vehicle, the lock apparatus 60 is switched from the locked state to the unlocked state as follows. The user moves the switch 61 from the ON position to the OFF position by his or her hand while putting the hand through the through hole 31 in the back plate 30. By the movement of the switch 61, the lock mechanisms 63 can be switched from the locked state to the unlocked state, and the display unit 62 interlocked with the movement of the switch 61 is switched from the ON display to the OFF display.

Method for Loading Baggage in Folded State of Electric vehicle

Figure 7:
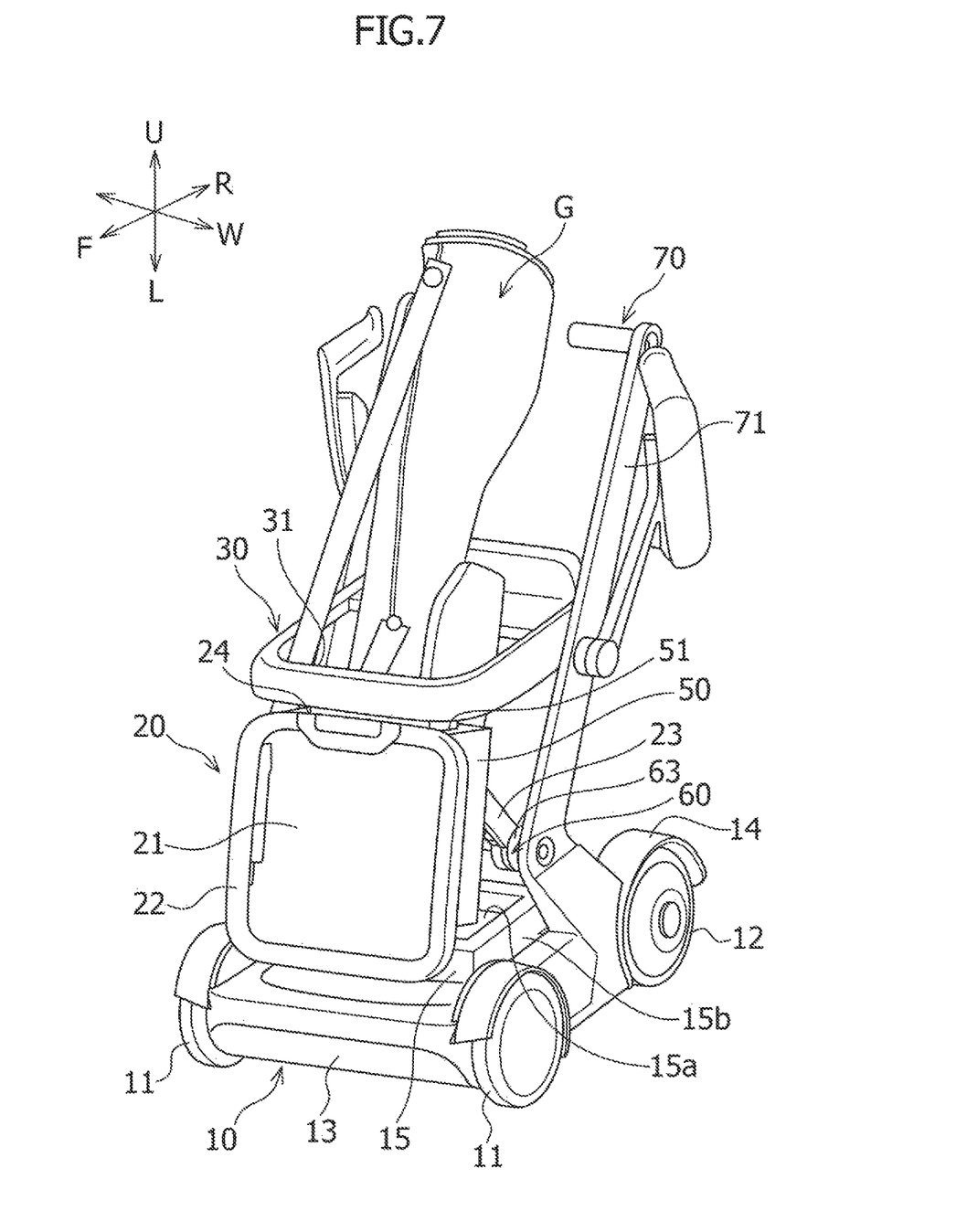
FIG. 7 is a perspective view schematically showing the electric vehicle according to the Embodiment in the folded state and a state in which a golf bag is loaded.

With reference to FIG. 7, one example of a method for loading the baggage on the cargo bed portion 15 in the folded state of the electric vehicle will be described. A case in which a golf bag G cited as one example of a long object, is loaded on the cargo bed portion 15, will be described herein. In the folded state of the electric vehicle as described above, the seat 20 is in the retracted position and the back plate 30 is in the laid down position.

In the folded state of the electric vehicle, the golf bag G is moved from the vehicle upper side toward the vehicle lower side so as to be inserted in the through hole 31 in the back plate 30. The golf bag G is placed on the loading surface 15a of the cargo bed portion 15. The golf bag G is stably loaded on the cargo bed portion 15 while being supported by the back plate 30 in a state of being inserted in the through hole 31.

In the electric vehicle according to this Embodiment above, a space positioned on the vehicle lower side with respect to the seating portion 22 of the seat 20 when the electric vehicle is in the unfolded state, and a space positioned on the vehicle rear side with respect to the seating portion 22 of the seat 20 when the electric vehicle is in the folded state are the same dead space in the electric vehicle. In the dead space as above, the cargo bed portion 15, on which the baggage can be loaded, is arranged. Therefore, the receiving space for the baggage can be efficiently secured in the electric vehicle. As a result, the electric vehicle can be downsized. The baggage can be stably loaded on the cargo bed portion 15 as above, and the electric vehicle can stably transport the baggage in a state in which the baggage is stably loaded on the cargo bed portion 15. In particular, in the folded state of the electric vehicle, a long object, such as the golf bag G and/or the like can be loaded on the cargo bed portion 15 while being inserted in the through hole 31 in the back plate 30. In this case, the baggage can be stably loaded on the cargo bed portion 15 while being supported by the back plate 30, and the electric vehicle can stably transport the baggage in a state in which the baggage is stably loaded on the cargo bed portion 15 while being supported by the back plate 30. The convenience of the electric vehicle can be improved.

In the electric vehicle according to this Embodiment, the seating portion 22 of the seat 20 includes the receiving portion 50, which is arranged on the seat lower side with respect to the sitting surface 21 and can receive the battery 40. The receiving portion 50 has the opening 51 formed in the rear-end portion of the seating portion 22 such that the battery 40 is receivable in the receiving portion 50 and the battery 40 is removable from the receiving portion 50. The through hole 31 in the back plate 30 is formed so as to correspond to the opening 51 in the receiving portion 50 of the seating portion 22 in the seat 20 and such that the battery 40 is passable therethrough in a state in which the seat 20 is in the retracted position and the back plate 30 is in the laid down position. Therefore, when the electric vehicle is in the unfolded state and the user is sitting on the seat, the battery 40 positioned on the outside of the electric vehicle, can be received in the receiving portion 50 of the seat 20 from the opening 51 in the rear-end portion of the seating portion 22 on the rear side of the electric vehicle. In this case, the battery 40 received in the receiving portion 50, can be removed from the opening 51 in the rear-end portion of the seating portion 22 on the rear side of the electric vehicle. When the electric vehicle is in the folded state, the battery 40 positioned on the outside of the electric vehicle, can be received in the receiving portion 50 from the opening 51 in the rear-end portion of the seating portion 22 on the upper side of the electric vehicle. In this case, the battery 40 received in the receiving portion 50, can be removed from the opening 51 in the rear-end portion of the seating portion 22 on the upper side of the electric vehicle. Therefore, the battery 40 can be efficiently replaced in a wide variety of circumstances, and the battery 40 can be efficiently charged in a wide variety of circumstances. Therefore, the convenience of the electric vehicle can be improved.

The electric vehicle according to this Embodiment includes the lock apparatus 60 formed so as to be capable of locking the relative movement of the front and rear bases 13 and 14 at least in the contracted state of the mobile base 10. The lock apparatus 60 includes the switch 61 formed to be capable of switching the locked state and the unlocked state of the lock apparatus 60. The switch 61 is arranged on the rear-end portion of the seating portion 22 of the seat 20. As shown in FIGS. 5 and 6, the through hole 31 in the back plate 30 is further formed so as to correspond to the switch 61 and be capable of visually recognizing the switch 61 through the through hole 31 in the back plate 30 in a state in which the seat 20 is in the retracted position and the back plate 30 is in the laid down position. Therefore, when the baggage is loaded on the electric vehicle in which the mobile base 10 is in the contracted state, the mobile base 10 can be locked in the contracted state by the switch 61 without forgetting. At this time, the baggage can be stably loaded on the cargo bed portion 15 of the electric vehicle. As a result, the electric vehicle can stably transport the baggage in a state in which the mobile base 10 is reliably locked in the contracted state of the mobile base 10. Therefore, the convenience of the electric vehicle can be improved.

In the electric vehicle according to this Embodiment, the lock apparatus 60 includes the display unit 62 capable of separately displaying the locked state and the unlocked state of the lock apparatus 60. The display unit 62 is arranged on the rear-end portion of the seating portion 22 of the seat 20. As shown in FIGS. 5 and 6, the through hole 31 in the back plate 30 is further formed so as to correspond to the display unit 62 and be capable of visually recognizing the display unit 62 through the through hole 31 in the back plate 30 in a state in which the seat 20 is in the retracted position and the back plate 30 is in the laid down position. Therefore, when the baggage is loaded on the electric vehicle in which the mobile base 10 is in the contracted state, it can be checked that the mobile base 10 is locked in the contracted state without forgetting by the display unit 62. At this time, the baggage can be stably loaded on the cargo bed portion 15 of the electric vehicle. As a result, the electric vehicle can stably transport the baggage in a state in which the mobile base 10 is reliably locked in the contracted state of the mobile base 10. Therefore, the convenience of the electric vehicle can be improved.

The Embodiment of the present invention has been described above, but the present invention is not limited to the Embodiment described above, and the present invention may be modified and changed based on the technical concept thereof.

REFERENCE SIGNS LIST

10 . . . Mobile base, 11 . . . Front wheel, 12 . . . Rear wheel, 13 . . . Front base, 14 . . . Rear base, 15 . . . Cargo bed portion, 20 . . . Seat, 21 . . . Sitting surface, 22 . . . Seating portion, 30 . . . Back plate, 31 . . . Through hole, 40 . . . Battery, 50 . . . Receiving portion, 51 . . . Opening, 60 . . . Lock apparatus, 61 . . . Switch, 62 . . . Display unit, H . . . Wheelbase

The invention claimed is:

1. An electric vehicle comprising:
a mobile base configured to be capable of traveling by an electromotive drive;
a seat arranged on the mobile base and including a seating portion having a sitting surface; and
a back plate arranged on the mobile base and configured to be usable as a backrest corresponding to the seating portion, wherein the mobile base includes: a front base having a front wheel; and a rear base arranged closer to a rear of the vehicle than to the front base and having a rear wheel, the front and rear bases are configured to be moveable relative to each other such that the mobile base is changeable between an expanded state in which a wheelbase between the front wheel and the rear wheel is expanded, and a contracted state in which the wheelbase is more contracted than in the expanded state, the seat is configured to be moveable between a sitting position in which the sitting surface is arranged so as to be directed to an upper direction of the vehicle, and a retracted position in which the seating portion is retracted from the sitting position to a front of the vehicle, the seat is configured so as to be arrangeable in the sitting position in the expanded state and be arrangeable in the retracted position in the contracted state, the back plate is configured to be moveable between a raised position closer to the rear of the vehicle and the upper of the vehicle than the seating portion in the sitting position, and a laid down position closer to the front of the vehicle than to the raised position, the back plate is arrangeable in the raised position in a state in which the seat is arranged in the sitting position, and is arrangeable in the laid down position in a state in which the seat is arranged in the retracted position, the mobile base includes a cargo bed portion configured such that baggage is loadable therein from the upper direction of the vehicle, the cargo bed portion is positioned closer to the lower direction of the vehicle than to the seating portion of the seat in the sitting position, and is positioned closer to the rear of the vehicle than to the seating portion of the seat in the retracted position, and the back plate has a through hole formed so as to face at least a part of the cargo bed portion in a vehicle upper-lower direction in a state in which the back plate is in the laid down position.

2. The electric vehicle as claimed in claim 1, further comprising a battery configured to be capable of supplying electric power used in the electromotive drive, wherein the seating portion of the seat includes a receiving portion capable of receiving the battery and arranged closer to the lower of the vehicle than to the sitting surface, the receiving portion has an opening formed in a rear-end portion of the seating portion in a seat front-rear direction such that the battery is receivable in the receiving portion and removeable from the receiving portion, and the through hole in the back plate is formed so as to correspond to the opening in the receiving portion of the seat in the retracted position and be capable of passing the battery through the through hole in a state in which the back plate is in the laid down position.

3. The electric vehicle as claimed in claim 1, further comprising a lock apparatus configured to be capable of locking a relative movement of the front and rear bases at least in the contracted state of the mobile base, wherein the lock apparatus includes a switch configured to be capable of switching a locked state and an unlocked state of the lock apparatus, the switch is arranged on a rear end portion of the seating portion of the seat, and the through hole in the back plate is further formed so as to correspond to the switch and be capable of visually recognizing the switch through the through hole in the back plate in a state in which the seat is in the retracted position and the back plate is in the laid down position.

4. The electric vehicle as claimed in claim 3, wherein the lock apparatus includes a display unit capable of separately displaying locking and unlocking of the lock apparatus, the display unit is arranged on the rear end portion of the seating portion of the seat, and the through hole in the back plate is further formed so as to correspond to the display unit and be capable of visually recognizing the display unit through the through hole in the back plate in a state in which the seat is in the retracted position and the back plate is in the laid down position.

* * * * *